No. 728,308. PATENTED MAY 19, 1903.
E. H. SCHOFIELD.
DIFFUSION APPARATUS.
APPLICATION FILED MAR. 10, 1902.
NO MODEL. 2 SHEETS—SHEET 1.
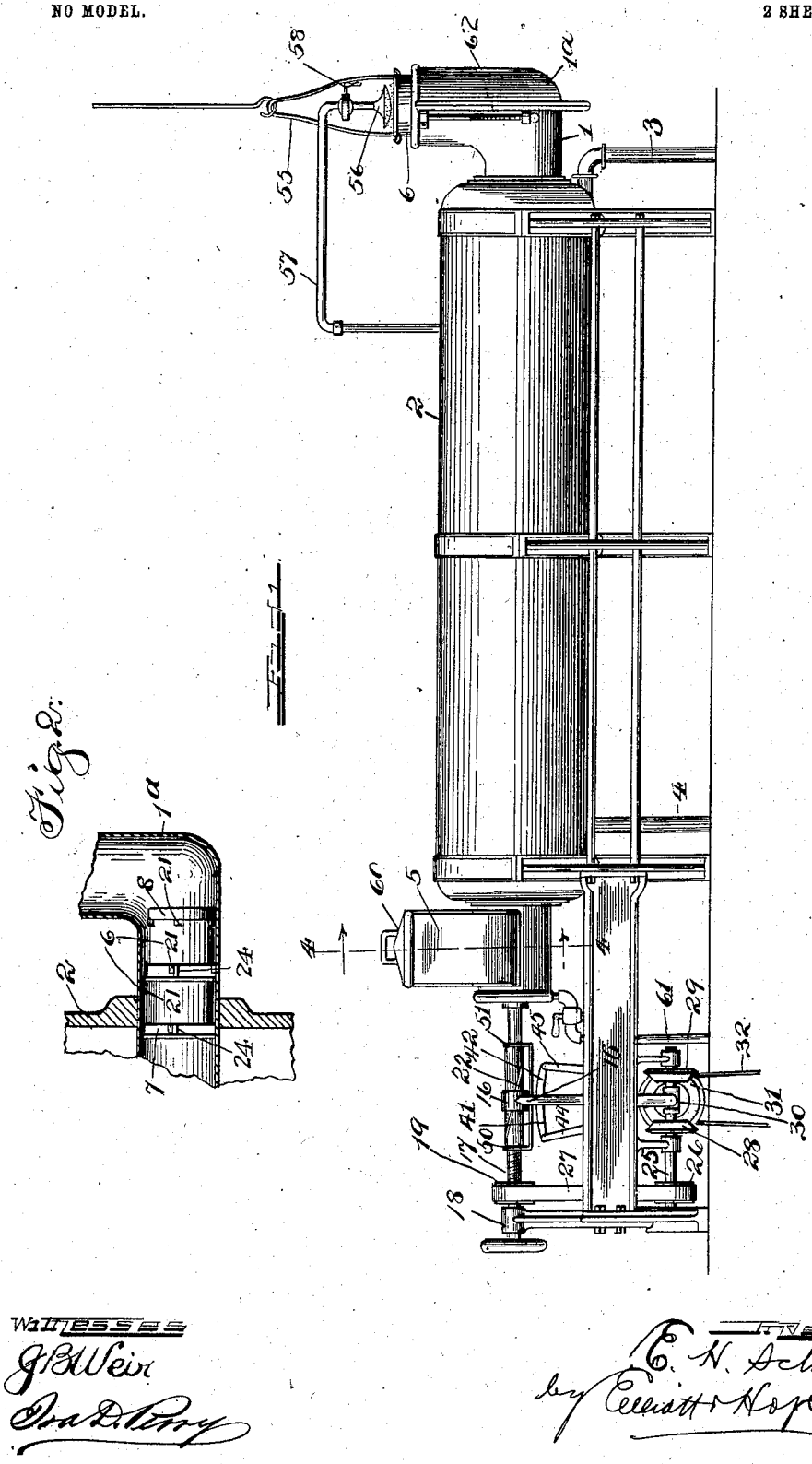

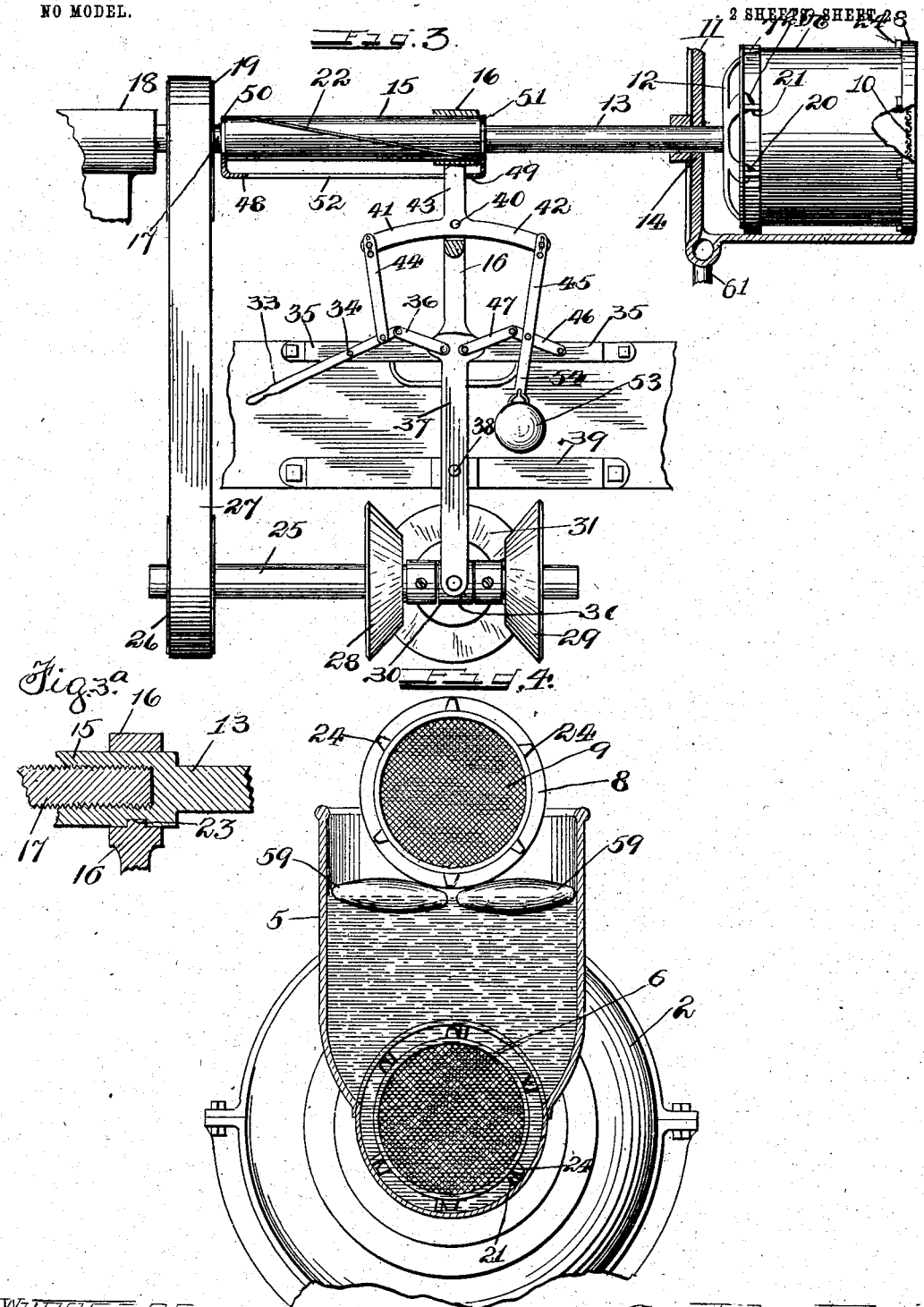

No. 728,308. Patented May 19, 1903.

UNITED STATES PATENT OFFICE.

EUGENE H. SCHOFIELD, OF TOLEDO, OHIO.

DIFFUSION APPARATUS.

SPECIFICATION forming part of Letters Patent No. 728,308, dated May 19, 1903.

Application filed March 10, 1902. Serial No. 97,556. (No model.)

*To all whom it may concern:*

Be it known that I, EUGENE H. SCHOFIELD, a citizen of the United States, residing at Toledo, in the county of Lucas and State of Ohio, have invented certain new and useful Improvements in Diffusing Apparatus, of which the following is a full, clear, and exact specification.

My invention relates to means for extracting soluble ingredients from granulated substances or substances in a state of fine subdivision, and more particularly to means for producing extract of coffee and extracts from other aromatic substances; and my invention has for its primary object to provide improved and efficient means for causing the substance from which the extract is to be obtained to pass through the liquid in a direction toward the liquid-inlet and away from the liquid-outlet, whereby the grounds or refuse matter will have no opportunity to again absorb any of the extract, and the extract will be brought in contact with none but the fresh material.

Another object of my invention is to pass the granulated or comminuted material through the liquid and at the same time revolve it in a body, so that it will be given an action equivalent to stirring, and hence the soluble ingredients may be extracted in a smaller space and in less time than would be possible by passing the material through the liquid without this rotary stirring action.

A still further object of the invention is to prevent the evaporation of the extract and the loss of its aromatic principle where the solid material is introduced into the liquid.

With these ends in view my invention consists in certain features of novelty in the construction, combination, and arrangement of parts by which the said objects and certain other objects, hereinafter appearing, are attained, all as fully described with reference to the accompanying drawings, and more particularly pointed out in the claims.

In the said drawings, Figure 1 is a side elevation of my improved machine. Fig. 2 is a detail vertical longitudinal sectional view of a portion thereof. Fig. 3 is an enlarged detail view, partly in section, showing one of the cartridges and the mechanism for advancing the cartridges through the extract-chamber. Fig. 3ᵃ is an enlarged detail sectional view of the sleeve and screw, hereinafter described; and Fig. 4 is a vertical transverse sectional view taken on the line line 4 4, Fig. 1, on a larger scale.

1 is a chamber, arranged in a horizontal position and preferably of cylindrical form, which constitutes the receptacle for the liquid and the solid or comminuted material from which the soluble properties are to be extracted. This chamber 1 is heated in any suitable way, but preferably by means of steam heat or hot water, and to this end it is surrounded by a heating jacket or drum 2, to one end of which is connected a supply-pipe 3, which leads through any suitable source of heat, such as hot water or steam, while the other end is connected to an outlet-pipe 4, whereby thorough circulation through the drum or jacket 2 may be produced. One end of this chamber 1, as shown in Fig. 1, protrudes from the drum or jacket 2 and is provided on its upper side with a box or hopper like receptacle 5, which opens into the cylindrical chamber 1, as better shown in Fig. 3, and which constitutes the inlet for the coffee or other solid material from which the extract is to be obtained. The coffee is introduced into the chamber 1 in suitable cartridges or receptacle-like holders, which are pervious to the liquid or water contained in chamber 1. One of these cartridges is shown in Fig. 3 in side elevation and another in cross-section in Fig. 4. Each of them consists of a cylindrical body portion 6, two heads 7 8, one of which is removable and both of which are provided with pervious diaphragms 9 10. These diaphragms 9 10 may be composed of wire-gauze or any suitable fabric and are for the purpose of holding the coffee in the cartridge while permitting the water or liquid to seep through. The cartridges are introduced sidewise in the hopper or box 5 in the manner indicated in Fig. 1 at the upper part of the figure and are allowed to sink through the box 5 and settle at the bottom of the protruding end of chamber 1 in the position indicated at the lower part of this figure. The chamber 1 is continued outwardly a slight distance beyond the outer wall of the hopper or box 5, as shown in Figs. 1 and 3, so as to constitute a recess 11 at the end of chamber 1 beyond the outer side of the box or hopper 5, and in this recess is situated a follower 12, which is of skeleton form, so as to permit of the free passage of the liquid through it. This follower is secured rigidly to the end of a shaft 13, which passes through a suitable stuffing-box 14 in the end of chamber 1 and is provided at its outer end with an elongated nut or sleeve 15, supported by a suitable bearing-collar 16, and is engaged internally by a screw 17, mounted in a suitable bearing 18, with capability of being revolved, but held firmly against longitudinal movement. On this screw 17 is secured a pulley 19, whereby the screw may be revolved and the follower 12 thereby caused to reciprocate back and forth in the chamber 1, and hence successively push the cartridges forward in the chamber as they are lowered through the hopper or box 5 to the front side of the follower. In order that the cartridges may be revolved in the chamber 1 as they go forward for producing the effect of a stirring action on the body of coffee, and thereby more readily separating out the soluble properties, as before explained, the follower is provided with means whereby it may clutch the cartridge and the shaft 13 with means whereby it will rotate as it reciprocates. A simple way of accomplishing this consists in providing the follower with teeth 20, which engage with lugs 21 on one end of the cartridge, so that as the shaft 13 revolves the cartridge will revolve with it; but the follower will be free to recede from the cartridge when the follower reaches the limit of its forward stroke. In order that the shaft may revolve as it advances, the exterior of the sleeve 15 is provided with a spiral or inclined groove 22, in which engages a pin 23, planted in the inner face of the bearing 16. In order that this rotation of the follower may also revolve all of the cartridges contained in the chamber 1 throughout its entire length, the forward end of each cartridge is provided with a number of teeth 24, which, like the teeth 20, engage the lugs 21 on the rear ends of the cartridges. Motion is imparted to the pulley 19 for both advancing and retracting the follower from a counter-shaft 25, which is provided with pulley 26, connected by belt 27 with pulley 19 or by any other suitable means. This counter-shaft is provided with two friction-cones 28 29, splined thereon and connected to a shiftable collar 30, arranged between them on the shaft 25 in a familiar manner, so that by shifting the collar 30 in one direction the cone 28 may be caused to frictionally engage a driving-cone 31, driven by a belt 32 or other suitable device from any desired source of power, and when shifted in the opposite direction cone 29 may be caused to engage the driven cone 31, thus imparting rotation to shaft 25 alternately in opposite directions, and thereby advancing and retracting the follower. On the other hand, the cones 28 29 are so arranged that when placed in a central position, as shown in Fig. 3, neither will engage the driving-cone 31, and consequently the follower will remain at rest.

Assuming that the parts are in the position shown in Fig. 3 and it should be desired to start the machine for causing the follower to advance from the limit of its retracted movement into the chamber 1, the cone 29 may be thrown into engagement with the cone 31 by means of an operating-lever 33, pivoted at 34 to any suitable support 35 and having one end connected by a link 36 to a vertical lever 37, to the lower end of which the collar 30 is pivoted in the usual way. This lever 37 is pivoted at 38 to a suitable support 39, so that when the hand-lever 33 is depressed, as shown in Fig. 3, the upper end of lever 37 will be thrown toward the left and cone 28 forced against driving-cone 31, and when the lever 33 is raised the reverse motion will be produced and the cone 29 will be forced against driving-cone 31. In order that these cones may be thus shifted automatically as soon as the follower 12 reaches the limit of its inward stroke, the upper end of the lever 37 is provided with a yoke pivoted at 40 to the lever 37 and having three arms 41 42 43. The arm 41 is connected by link 44 to the short arm of operating-lever 33, such short arm, together with the link 36, constituting a toggle, so that when the yoke-arm 43 is oscillated toward the right, raising arm 41, the joint of the toggle will be broken and the lever 37 oscillated toward the left in such a manner as to throw cone 28 against cone 31. The arm 42 of the yoke is connected by a link 45 with one member 46 of a toggle, whose other member 47 is pivotally secured to the lever 37, member 46 being pivoted to support 35. Hence when the yoke-arm 42 is raised the joint of toggle 46 47 will be broken and opposite movement (toward the right) of lever 37 produced. Yoke 41 42 43 is thus oscillated automatically by means of two tappets carried with the sleeve 15. These tappets are constituted by shoulders 48 49, located near opposite ends of the sleeve 15, so that when the sleeve reaches the limit or is about to reach the limit of its inward stroke the tappet 48 will strike yoke-arm 43 and oscillate lever 37 toward the left and shift the clutch or friction cone 28 against cone 31 in the proper direction for reversing the rotary movement of shaft 13, and thereby causing the follower to recede, and by the time the follower is about to reach the limit of its outward movement shoulder 49 strikes arm 43 and oscillates lever 37 in the opposite direction or toward the right, causing it to assume the central position shown in Fig. 3, with both cones 28 29 out of engagement with cone 31, whereupon motion of shaft 13 ceases with the follower in its retracted position in readiness to be again started inward by lifting the lever 33. These tappets 48 49 are formed on a bar whose ends 50 51 are journaled loosely on the shaft 13 and the screw 17, so that the bar will move with the sleeve 15 longitudinally, but need not revolve therewith. The bar is also provided with a longitudinal slot 52, extending between the shoulders 48 49 and into which slot the arm 43 projects, whereby the bar is held against rotary motion with the sleeve.

The toggle 46 47 is weighted with a weight 53, connected thereto by being secured to an extension 54 of the link 45. It will be understood, however, that the toggle constituted by the short arm of lever 33 and the link 36 will remain in a straight line until the tappet 48 strikes arm 43, whereupon the joint of the toggle will be broken, and the weight 53 will throw cone 28 into engagement with driving-cone 31 by pulling down on toggle 46 47 and forcing the upper end of lever 37 to the left, where it will be held by weight 53 and remain until tappet-arm 49 strikes arm 43 and breaks the joint of toggle 46 47, thus shifting lever 37 to the right and throwing cone 28 out of engagement with cone 31 and leaving the parts in their neutral or inactive position until the lever 33 is again raised, it being understood that the motion of the tappet 49 is merely sufficient to break the joint of the toggle 46 47 without oscillating the yoke-arms 41 42 a sufficient distance to throw the clutch members 29 31 into action. When the follower 12 is at the limit of its outward movement, the tappet 49 is in such a position, as shown in Fig. 3, as to support the weight 53 and hold the latter from forcing cone 28 into engagement with cone 31.

It will be understood that after the chamber 1 has become filled throughout its length with the cartridges a cartridge will be taken out at one end each time a cartridge is inserted at the other end. In order that this may be done, one end of chamber 1 is curved upwardly on the exterior of the drum 2, as shown at 1ª, so that the cartridges may easily turn from a horizontal line of movement to a vertical line of movement and be lifted out of the upright portion of this elbow-like formation 1ª with any suitable bail 55 or other device, the contents emptied, and the cartridge refilled for being again passed through the machine. As the cartridge is raised it receives a shower of fresh water from a rose 56, arranged over the mouth of the elbow 1ª and supplied from the jacket or drum 2 through pipe 57, cock 58 being arranged in pipe 57 for controlling the discharge.

In order that the steam and aroma may not escape from the box or hopper 5 as the cartridges are inserted, a pair of floats 59, each equal to approximately half the width of the box or hopper 5, are arranged therein, as shown in Fig. 4, so as to subsequently cover the entire surface of the liquid and be capable of permitting the cartridges to descend between them, while keeping the entire surface of the liquid substantially covered. The hopper or box 5 may also be provided with any suitable cover 60, which may be removed when a cartridge is to be inserted.

The extract is drawn off from the chamber 1 through a pipe 61, located adjacent to the hopper or box 5.

62 is a gage for indicating the level of the liquid in chamber 1.

Having thus described my invention, what I claim as new therein, and desire to secure by Letters Patent, is—

1. In a diffusing apparatus the combination of an elongated chamber for a liquid or solvent, a pervious inclosing receptacle for the substance to be treated of substantially the same cross-area as said chamber having sides and ends constituting a complete inclosure, said chamber having an inlet at one end and an outlet at the other end for said receptacle, and means for pushing said receptacle through said chamber, substantially as set forth.

2. In a diffusing apparatus the combination of an elongated chamber for a liquid or solvent, a plurality of pervious independent cartridges for containing the substance to be treated, each having inclosing sides and ends and constituting a complete inclosure, said chamber having an inlet at one end and an outlet at the other end for said cartridges, and means for pushing said cartridges through said chamber, substantially as set forth.

3. In a diffusing apparatus the combination of an elongated chamber for a liquid or solvent, a pervious holder for the substance to be treated, said chamber having an inlet at one end and an outlet at the other end for said holder, and a reciprocatory follower for forcing said holder through said chamber, substantially as set forth.

4. In a diffusing apparatus the combination of an elongated chamber for a liquid or solvent, a pervious holder for the substance to be treated, said chamber having an inlet at one end and an outlet at the other end for said holder, and means depressible by said holder for closing said inlet, substantially as set forth.

5. In a diffusing apparatus the combination of a chamber for a liquid or solvent, a pervious holder for the substance to be treated, said chamber having an inlet at one end and an outlet at the other end for said holder, a follower for forcing said holder through said chamber and an exterior operating means for reciprocating said follower, said follower being retracted beyond said inlet, whereby the holder may be inserted in front of the follower, substantially as set forth.

6. In a diffusing apparatus the combination of a chamber for containing a liquid, a holder for the material to be treated having passages for the liquid, and means for advancing said holder through said chamber and imparting axial rotation to the latter, substantially as set forth.

7. In a diffusing apparatus the combination of a chamber for containing a liquid, a number of independent interlocking holders for the material to be treated having passages for said liquid and means for advancing said holders through said chamber and imparting axial rotary motion thereto, substantially as set forth.

8. In a diffusing apparatus the combination of a chamber for containing a liquid, a holder for the soluble material and means for advancing said holder through said chamber and imparting axial rotation thereto, substantially as set forth.

9. In a diffusing apparatus the combination of a chamber for containing a liquid, a number of interlocking holders for a soluble material and means for advancing said holders through said chamber and imparting axial rotary motion thereto, substantially as set forth.

10. In a diffusing apparatus the combination of a chamber for containing a liquid, a holder for the soluble material having lugs, and a reciprocating rotary follower for advancing and rotating said holder, substantially as set forth.

11. In a diffusing apparatus, the combination of a chamber for containing a liquid, a holder for the soluble material, a follower for advancing said holder, a screw and a nut for advancing said follower, one of the two last said having a spiral groove, and a lug engaging in said groove for imparting a rotary motion to the follower as it reciprocates, substantially as set forth.

12. In a diffusing apparatus the combination of a chamber for a liquid, a holder for the soluble material, a follower located in said chamber for advancing said holder therethrough, a reciprocatory rod to which said follower is secured, a nut on said rod, having a spiral groove, a screw engaging in said nut, a lug engaging in said groove, and means for rotating said screw, substantially as set forth.

13. In a diffusing apparatus the combination of a chamber for a liquid, a holder for the soluble material, a reciprocatory member for advancing said holder, driving means for reciprocating said member and means for reversing the motion of said driving means at the end of the stroke of said reciprocatory member, substantially as set forth.

14. In a diffusing apparatus the combination of a chamber for a liquid, a holder for the soluble material, a reciprocatory member for advancing said holder in said chamber, a driving member, a reversing-gear comprising a shiftable member, means for imparting the motion of said reverse-gear to said reciprocatory member and means movable with said reciprocatory member for engaging said shifting member and actuating said reversing-gear at the end of the stroke of said reciprocatory member, substantially as set forth.

15. In a diffusing apparatus the combination of a chamber for a liquid, a holder for the soluble material, a reciprocatory member for advancing said holder in said chamber, a driving member, a reversing-gear coöperating therewith for transmitting motion therefrom, means for transmitting the motion of said reversing-gear to said reciprocatory member, a lever for shifting said reversing-gear and means operatively connecting said lever with said reciprocatory member, substantially as set forth.

16. In a diffusing apparatus the combination of a chamber for a liquid, a holder for the soluble material, a reciprocatory member for advancing said holder in said chamber, a reversing-gear, means for imparting the motion of said reversing-gear to said reciprocatory member, a lever for actuating said reversing-gear, a yoke pivotally connected to said lever and comprising two arms, a toggle pivotally connected with each of said arms, means for oscillating one of said toggles and means for imparting the motion of said reciprocatory member to said yoke for oscillating said toggles, substantially as set forth.

17. In a diffusing apparatus the combination of a chamber for a liquid, a holder for the soluble material, a reciprocatory member for advancing said holder in said chamber, a reversing-gear, means for imparting the motion of said reversing-gear to said reciprocatory member, a lever for actuating said reversing-gear, a yoke pivotally connected with said lever and comprising two arms, a weighted toggle connected with one of said arms and with said lever, a toggle connected with the other of said arms and with said lever and having means whereby it may be oscillated, and means for imparting the motion of said reciprocatory member to said yoke, substantially as set forth.

18. In a diffusing apparatus the combination of a chamber for a liquid, a holder for the soluble material, a reciprocatory member for advancing said holder in said chamber, a reversing-gear, means for imparting the motion of said reversing-gear to said reciprocatory member, a lever for actuating said reversing-gear, a yoke pivotally connected to said lever and having three arms, toggles connected with said lever and with two of said arms, respectively, and means movable with said reciprocatory member for imparting the motion thereof to the third one of said arms, substantially as set forth.

19. In a diffusing apparatus the combination of a chamber for a liquid, a holder for the soluble material, a reciprocatory member for advancing said holder in said chamber, a reversing-gear, means for imparting the motion of said gear to said reciprocatory member, a lever for actuating said gear, means for oscillating said lever comprising an arm, and a slotted bar movable with said reciprocatory member and in the slot of which said arm engages for oscillating said lever, substantially as set forth.

20. In a diffusing apparatus the combination of a chamber for a liquid having a box at one end thereof, a holder for the soluble material adapted to be inserted through said box, and a float in said box for protecting the surface of the liquid therein from evaporation, substantially as set forth.

21. In a diffusing apparatus the combination of a chamber for a liquid having a box at one end thereof, a pair of floats located in said box for protecting the surface of the liquid therein from evaporation and a holder for the soluble material adapted to be inserted into said chamber through said box, substantially as set forth.

EUGENE H. SCHOFIELD.

Witnesses:
L. C. COLE,
JOSEPH R. W. COOPER.